US012483706B1

(12) United States Patent
Ebling

(10) Patent No.: US 12,483,706 B1
(45) Date of Patent: Nov. 25, 2025

(54) SYSTEMS AND METHODS FOR A SMOOTH TEMPORALLY SEGMENTED ENCODING OF DYNAMIC UNSTRUCTURED SPATIAL DATA

(71) Applicant: Illuscio, Inc., Culver City, CA (US)

(72) Inventor: Timothy Ebling, Woodinville, WA (US)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/302,310

(22) Filed: Aug. 18, 2025

(51) Int. Cl.
*H04N 19/136* (2014.01)
*H04N 19/119* (2014.01)
*H04N 19/172* (2014.01)

(52) U.S. Cl.
CPC ......... *H04N 19/136* (2014.11); *H04N 19/119* (2014.11); *H04N 19/172* (2014.11)

(58) Field of Classification Search
CPC .. H04N 19/136; H04N 19/119; H04N 19/172; H04N 21/234; H04N 21/8146; H04N 21/816; H04N 21/4728; H04N 19/184; G06T 17/00; G06T 15/08; G06T 9/00; G06T 2210/56; G06T 19/20; G06T 19/00; G06T 2200/04; G06T 2207/10028; G06V 10/764
USPC ............................................ 375/240–240.29
See application file for complete search history.

(56) References Cited

U.S. PATENT DOCUMENTS 12,266,050 B1 * 4/2025 Looper .................. G06T 15/20
12,413,828 B1 * 9/2025 Bogacz ............... H04N 21/8146
2025/0308144 A1 * 10/2025 Sun ........................... G06T 7/73

OTHER PUBLICATIONS

Gong et al. "Adaptive 3D Gaussian Splatting Video Streaming: Visual Saliency-Aware Tiling and Meta-Learning-Based Bitrate Adaptation", Jul. 19, 2025, 14 Pages.*
Hu et al. "4DGC: Rate-Aware 4D Gaussian Compression for Efficient Streamable Free-Viewpoint Video" IEEE Aug. 13, 2025, 11 Pages.*
Wang et al., "V3: Viewing Volumetric Videos on Mobiles via Streamable 2D Dynamic Gaussians", Sep. 23, 2024, 13 pages, ACM Trans. Graph., vol. 43, No. 6, Article.

* cited by examiner

*Primary Examiner* — Nathnael Aynalem
(74) *Attorney, Agent, or Firm* — Ansari Katiraei LLP; Arman Katiraei; Sadiq Ansari

(57) ABSTRACT

A system and associated methods perform smooth temporally segmented encoding of dynamic unstructured spatial data or dynamic three-dimensional (3D) content. The system receives the primitives that define visual changes to the dynamic 3D content across multiple frames. The system determines a first set of primitives that remain unchanged for at least N frames and a second set of primitives that remain unchanged for less than the N frames. The system generates a first data stream that encodes the first set of primitives with temporal values at a reduced frame rate, and generates a second data stream that encodes the second set of primitives without temporal values at the desired frame rate. The system streams the first data stream and the second data stream in response to a request for the dynamic 3D content.

20 Claims, 7 Drawing Sheets

SYSTEMS AND METHODS FOR A SMOOTH TEMPORALLY SEGMENTED ENCODING OF DYNAMIC UNSTRUCTURED SPATIAL DATA

BACKGROUND

Streaming static three-dimensional (3D) content involves orders of magnitude more data than streaming static two-dimensional (2D) content because the 2D content is defined about a single plane whereas the 3D content is defined across multiple planes. Streaming dynamic unstructured spatial data or dynamic 3D content may involve streaming the 3D data for every frame of the dynamic 3D content.

New encoding techniques are therefore needed to make dynamic 3D content streaming viable. 3D Gaussian splatting (3DGS) techniques were developed for encoding static 3D content. When used to encode dynamic 3D content, 3DGS may create visual discontinuity between the frames as 3DGS trains each frame of the dynamic 3D content without referencing the final set of splats created for a previous frame such that the transition between frames is not smooth as splats may appear and disappear or jump from one position to another creating flashing artifacts and/or visual popping.

Four-dimensional Gaussian splatting (4DGS) adapts 3DGS to handle dynamic 3D content. 4DGS encodes each primitive with a 4D mean and a 4×4 covariance matrix so that the primitive may span across time rather than be duplicated for every frame of the dynamic 3D content. While reducing the redundant definition of primitives that span multiple frames, the added attributes to each primitive still results in an encoding that is too large to stream in real-time and/or at a desired frame rate over existing data networks.

DETAILED DESCRIPTION OF PREFERRED EMBODIMENTS

Figure 1:
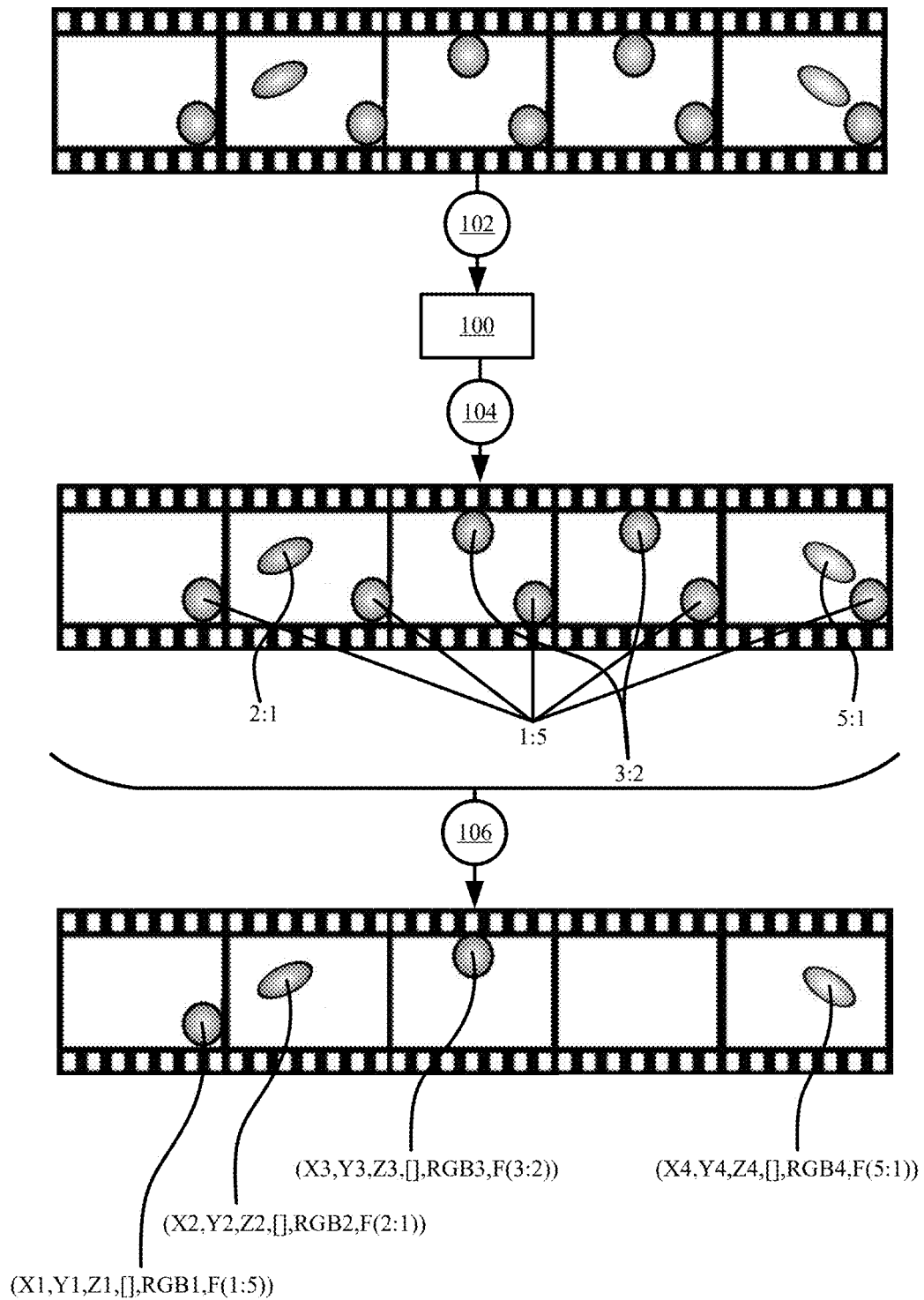
FIG. 1 illustrates an example of defining an opacity function for primitives of dynamic three-dimensional (3D) content in accordance with some embodiments presented herein.

The following detailed description refers to the accompanying drawings. The same reference numbers in different drawings may identify the same or similar elements.

Provided are systems and associated methods for a smooth temporally segmented encoding of dynamic unstructured spatial data or dynamic three-dimensional (3D) content. The systems and methods provide a new, enhanced, and/or alternative technique to four-dimensional Gaussian splatting (4DGS) that optimizes the dynamic 3D content for streaming over existing data networks.

The smooth temporally segmented encoding includes defining temporal values for points in time and durations that primitives of the dynamic 3D content are presented without change except for opacity. The temporal values allow a primitive to be defined once or encoded as part of a single frame and be presented across multiple frames without repeating the definition or specifying an adjustment to that primitive in each of the multiple frames. The primitives are grouped according to their temporal values. The different groups of primitives may be encoded and compressed using different encoding and compression techniques in order to reduce the number of primitives that are encoded to each frame of the dynamic 3D content and further reduce the amount of data encoded for each primitive. Consequently, the smooth temporally segmented encoding of the dynamic 3D content has a reduced size relative to the dynamic 3D content encoded using 4DGS techniques.

The smooth temporally segmented encoding is a paradigm shift away from motion estimation based video encoding. Motion estimated based video encoding typically involves modeling each primitive of the dynamic 3D content as a persistent "particle" that potentially moves about in space and encoding that movement in the frames that follow a key frame with the primitive definition. Instead, the smooth temporally segmented encoding models each primitive of the dynamic 3D content as an ephemeral particle with fixed properties (e.g., position, scale, orientation, color, spherical harmonics, etc.) and with an opacity function that varies with time. The opacity function represents the temporal values as a differentiable function that is symmetric about some time t, for temporal smoothing. Optimizing or defining the opacity function involves finding the best values for the opacity function coefficients. In some embodiments, the function width represents the duration or lifetime for a primitive and the function height represents the maximum opacity at which the primitive is presented. In order to reduce the complexity of globally optimizing across an entire dataset, the 3D streaming system may choose a fixed range of discrete values for the temporal width and optimize across time ranges proportional to that width.

A 3D streaming system implements the smooth temporally segmented encoding by defining the opacity functions, sorting the primitives based on their opacity function definition and/or temporal classification, and assigning the primitives to two or more time scale bins based on the temporal width of the primitive's opacity function. In some embodiments, the 3D streaming system assigns primitives with a temporal width that spans the stream duration or the duration of a segmented slice of the dynamic 3D content to a first bin, assigns primitives with a temporal width that is less than the stream or slice duration and more than a duration of single frame to a second bin, and assigns primitives with a temporal width that spans the duration of a single frame to a third bin. The 3D streaming system encodes the primitives grouped to the different bins with different amounts of data using different techniques or at different frame rates. For instance, the 3D streaming system encodes the primitives that are grouped to the first bin without the temporal values as a single set of two-dimensional (2D) images, encodes the primitives that are grouped to the second bin with the temporal values as a video stream with a reduced first frame rate, and encodes the primitives that are grouped to the third bin without the temporal values as a video stream with a second frame rate that matches the original frame rate of the dynamic 3D content. The 3D streaming system may apply different compression during the different encoding of the groups of primitives. In some embodiments, the 3D streaming system smooths the data for the primitives associated with each group to improve compression.

The different encoding of the different temporal groups of primitives optimizes the dynamic 3D content for streaming by minimizing the amount of data that is streamed per frame and for the entirety of the dynamic 3D content. For instance, the 3D streaming system may stream the encoded data for the primitives grouped to the first bin (e.g., static or constant primitives that do not change for the duration of the stream), may stream the encoded data for the primitives grouped to the second bin (e.g., slower changing primitives that change after two or more frames) at a reduced frame rate, and may stream the encoded data for the primitives grouped to the third bin (e.g., primitives that frequently change or change after one frame) in every frame.

FIG. 1 illustrates an example of defining the opacity function for primitives of dynamic 3D content in accordance with some embodiments presented herein. 3D streaming system 100 receives (at 102) the dynamic 3D content. The dynamic 3D content may include animated 3D content that is defined with different sets of primitives across a set of frames. The primitives may correspond to splats of a splat encoding. Each splat of the splat encoding may be defined with a position in 3D space (e.g., x, y, and z coordinates), a covariance matrix that stores a scaling value for the radius or shape of the splat, orientation or rotational information, spherical harmonics that represent some visual characteristics of the splat, and/or other shape or visual attributes of the splat.

3D streaming system 100 tracks (at 104) the time or frame at which each primitive appears and the duration with which each primitive is unchanged across the different frames of the dynamic 3D content. The primitive tracking (at 104) may include analyzing if the position and/or visual attributes of each primitive changes from one frame of the dynamic 3D content to a next and determining the one or more frames at which a primitive is unchanged.

3D streaming system 100 defines (at 106) an opacity function for the primitives based on tracked (at 104) timing and duration. The opacity function may be a differentiable function with a first parameter that specifies the peak opacity of the primitive and a second parameter for the opacity width. The peak opacity may correspond to the time or the median frame where the primitive is presented with its original attributes unchanged. The opacity width may correspond to the duration and/or number of frames where the primitive is rendered as part of the dynamic 3D content. In some embodiments, the opacity width may be defined to exceed the tracked (at 104) frame duration in order to smoothly blend the primitive in and out of the frames where the primitive is visible. Accordingly, the opacity function may define a gradual or Gaussian increase of the primitive opacity to the peak opacity and a gradual or Gaussian decrease of the primitive opacity from the peak opacity across the set of dynamic 3D content frames where the primitive is visible or for one or more frames before and after the set of dynamic 3D content frames where the primitive is visible. In some embodiments, 3D streaming system 100 reduces the complexity of defining the opacity function across the entire dataset by choosing a fixed range of discrete values for the opacity width and optimizing across time ranges proportional to that opacity width.

3D streaming system 100 analyzes the opacity function and/or temporal values assigned to the dynamic 3D content primitives and groups the primitives to temporally related bins. 3D streaming system 100 performs the temporal segmentation of the dynamic 3D content primitives in order to minimize the amount of data that is encoded to represent the primitives from each temporally related bin and to apply different encodings and compressions to the primitives of each temporally related bin.

Figure 2:
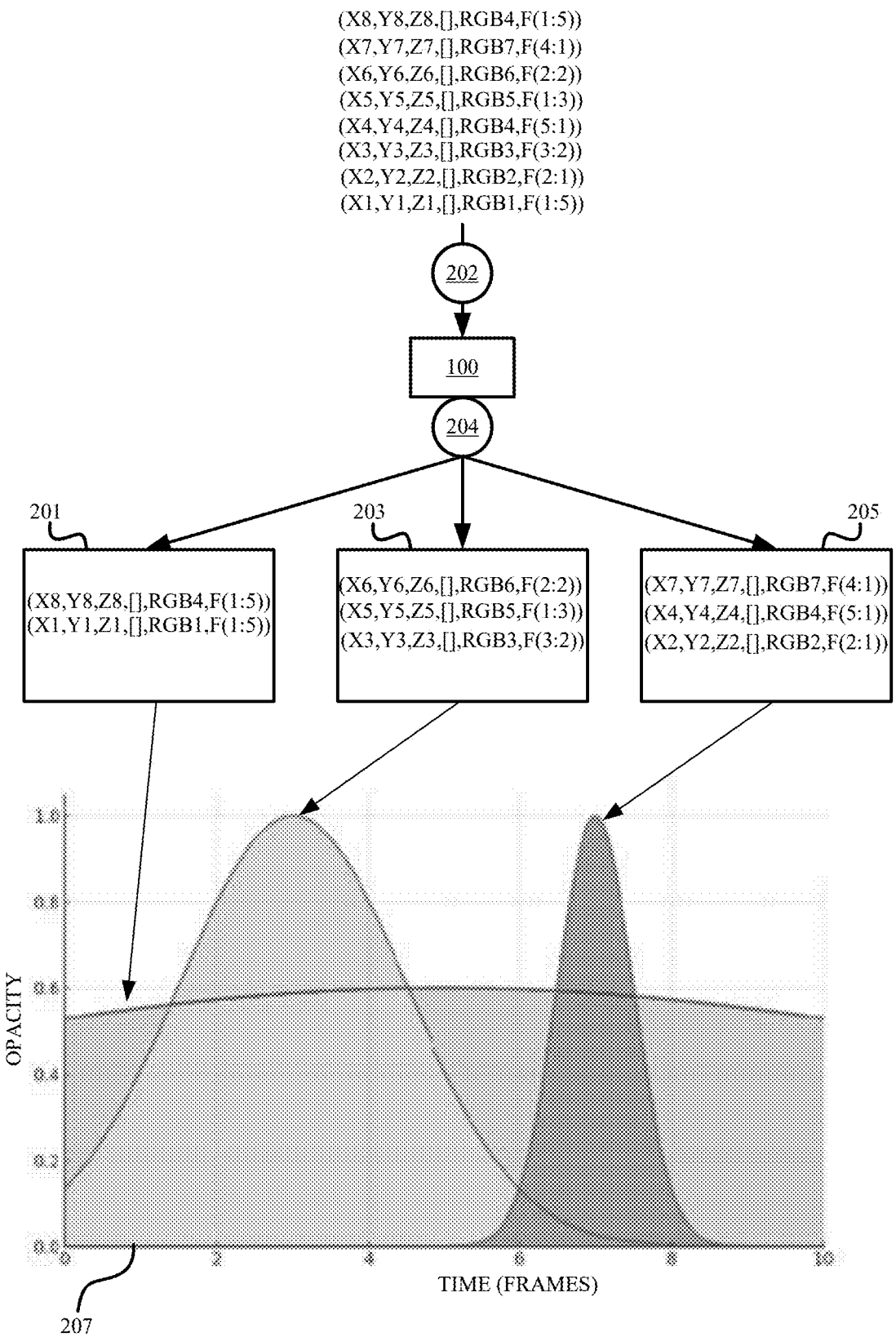
FIG. 2 illustrates an example of the temporal segmentation of the dynamic 3D content primitives based on the defined opacity functions in accordance with some embodiments presented herein.

FIG. 2 illustrates an example of the temporal segmentation of the dynamic 3D content primitives based on the defined opacity functions in accordance with some embodiments presented herein. 3D streaming system 100 receives (at 202) the dynamic 3D content primitives with the assigned temporal values, wherein the temporal values specify the median frame or median time at which a primitive is presented with its originally defined values and the width or duration at which the primitive is presented without change. The width or duration may specify a number of frames and/or time before and after the median frame or median time and may include an additional number of frames and/or amount of time for blending a primitive in and out of its originally defined values.

3D streaming system 100 classifies (at 204) each primitive into one of several time scale bins 201, 203, and 205 based on the primitive's temporal values. In some embodiments, 3D streaming system 100 defines first bin 201 for static or constant primitives that are visible and do not change for the duration of the dynamic 3D content, second bin 203 for slower changing primitives that are visible for less than the duration of the dynamic 3D content and more than a minimum number of N frames (e.g., at least two frames), and third bin 205 for fast changing primitives that are visible and change in every frame or less than the minimum number of N frames. In some such embodiments, 3D streaming system 100 classifies (at 204) a first set of primitives with opacity functions that indicate that the first set of primitives are presented for the entire duration of the dynamic 3D content to a first classification or first bin 201. The first set of primitives may therefore correspond to static primitives of the dynamic 3D content. 3D streaming system 100 classifies (at 204) a second set of primitives with opacity functions that indicate that the second set of primitives are presented for at least N frames and less than the entire duration of the dynamic 3D content to a second classification or second bin 203. N may be a scalar value that is greater than 1. 3D streaming system 100 classifies (at 204) a third set of primitives with opacity functions that indicate that the third set of primitives are presented for a single frame or less than the N frames without change over the duration of the dynamic 3D content to a third classification or third bin 205. Classifying (at 204) the primitives may include assigning a tag or label to each primitive or storing the primitives to different groups.

Chart 207 provides an example representation for the opacity over time of different primitives that are classified (at 204) as static primitives of first bin 201, slower changing primitives of second bin 203, and fast changing primitives 205 of third bin 205. The "bell curve" representation of the opacity may stem from defining the opacity functions as differentiable kernel functions. In some embodiments, the opacity may be represented as discrete values that are constant over the duration of a single frame.

As illustrated in chart 207, the opacity of the static primitives is constant or varies little over time or the set of frames associated with the dynamic 3D content. The opacity of the slower changing primitives peaks for a duration spanning N frames and less than the total time or set of frames associated with the dynamic 3D content, wherein N may be two or more frames. The opacity of the fast changing primitives peaks for a duration spanning less than N frames.

The temporal segmentation is performed to differentiate the primitives that are streamed at the original frame rate of the dynamic 3D content (e.g., the primitives grouped to third bin 205) from the primitives that may be streamed once (e.g., the primitives grouped to first bin 201) or at a reduced frame rate (e.g., the primitives grouped to second bin 203) and that may be rendered for multiple frames. Consequently, the temporal segmentation allows 3D streaming system 100 to reduce the amount of data that is streamed for various frames of the dynamic 3D content and to reduce the total amount of data streamed over the duration of the dynamic 3D content.

Moreover, 3D streaming system 100 may encode the primitive data assigned to different bins 201, 203, and 205 differently and may apply different compression to the primitive data assigned to different bins 201, 203, and 205. The different encoding may exclude the temporal values and/or the opacity function definition from the encoding of the primitives in first bin 201 and third bin 205 and include the temporal values and/or the opacity function definition with the encoding of the primitives in second bin 203. 3D streaming system 100 may also use different encoding techniques to optimize the primitive data in each bin 201, 203, and 205 for streaming. For instance, the primitive data in first bin 201 may be encoded as a single set of 2D images, the primitive data in second bin 203 may be encoded at a reduced frame rate using a 2D video encoding technique, and the primitive data in third bin 205 may be encoded at the original frame rate using the same or a different 2D video encoding technique. The different compression applied to the primitive data in each bin 201, 203, and 205 maximizes the data reduction that is achieved based on properties associated with the primitives in each bin 201, 203, and 205.

In some embodiments, 3D streaming system 100 performs the temporal segmentation across different time slices or partitioned segments of the dynamic 3D content. For instance, the dynamic 3D content may have an unlimited duration or a full duration of two minutes. 3D streaming system 100 may partition the dynamic 3D content into 10 second time slices and may perform a temporal segmentation for the primitives defined in the frames of each 10 second time slice. In some such embodiments, every 10 seconds of the dynamic 3D content is treated as a different file, streamable asset, and/or different dynamic 3D content. Segmenting the dynamic 3D content into smaller slices reduces the amount of data that is analyzed, encoded, and/or compressed at one time and also increases the data reduction by increasing the likelihood of a primitive being classified as a static, constant, or unchanging primitive for the shorter duration of a segmented slice rather than the longer duration of the full dynamic 3D content. In some other embodiments, the temporal segmentation is performed across the full duration of the dynamic 3D content.

Figure 3:
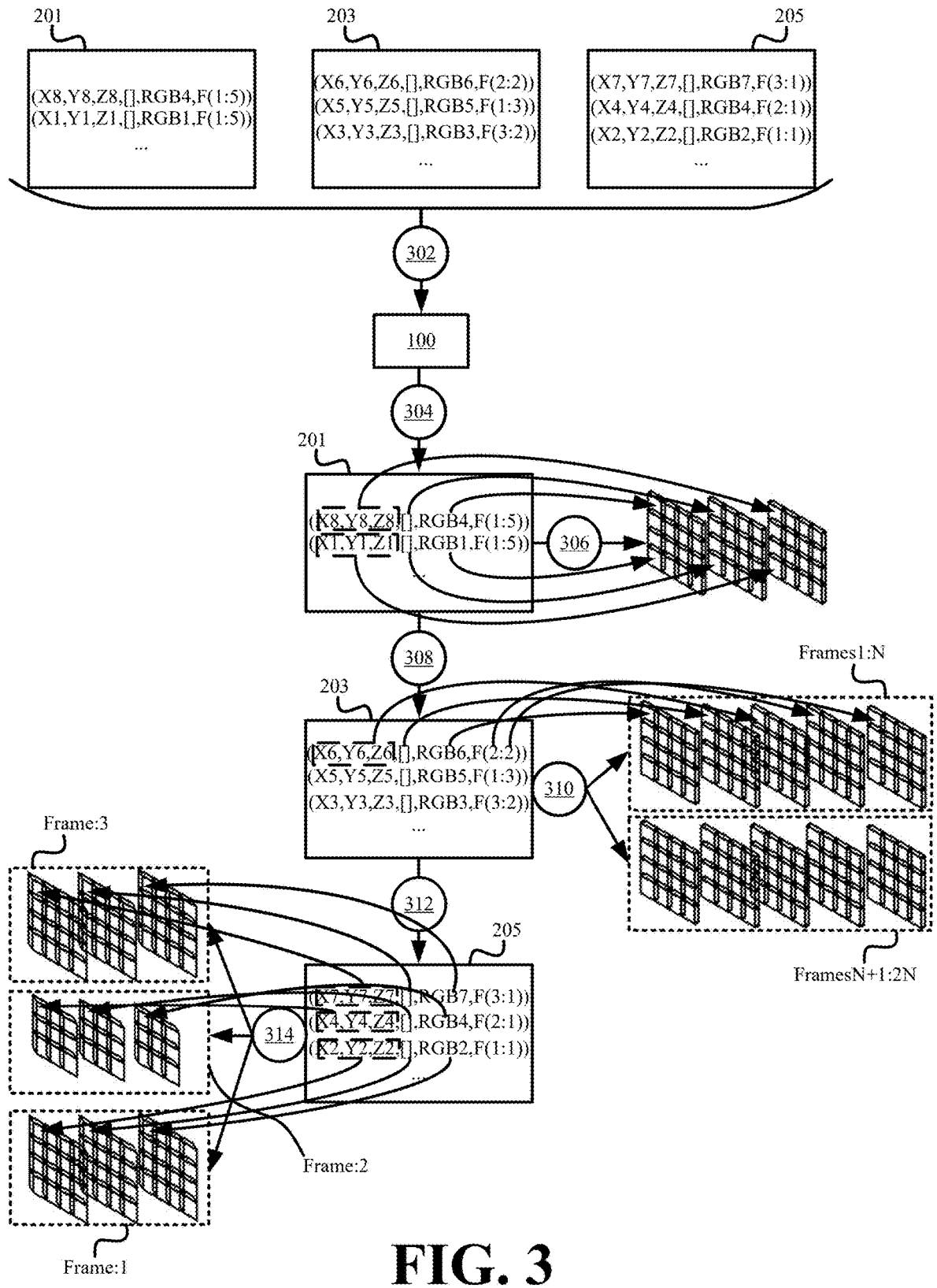
FIG. 3 illustrates an example of generating different encodings of the temporally segmented primitive data for dynamic 3D content in accordance with some embodiments presented herein.

FIG. 3 illustrates an example of generating different encodings of the temporally segmented primitive data for dynamic 3D content in accordance with some embodiments presented herein. 3D streaming system 100 receives (at 302) the temporally segmented primitive data for a segmented slice or the full duration of the dynamic 3D content. The temporally segmented primitive data includes the different groupings of the static or constant primitives to first bin 201, the slower changing primitives to second bin 203, and the fast changing primitives to third bin 205.

3D streaming system 100 selects (at 304) the static or constant primitives of first bin 201 for encoding. The static or constant primitives of first bin 201 are primitives that do not change for the duration of the segmented slice or dynamic 3D content that is being encoding. In other words, the static or constant primitives are defined with an opacity function that specifies a width spanning all frames or the entire duration of the segmented slice or dynamic 3D content that is being encoded.

3D streaming system 100 encodes (at 306) each attribute of each static or constant primitive to a different cell within a 2D grid or a different pixel of a 2D image. Since the static or constant primitives do not change for the duration of the dynamic 3D content or the dynamic 3D content segment being encoded, there is no need to encode (at 306) the temporal values for the static or constant primitives. Accordingly, the first cell of a first grid may encode the x, y, and z coordinate values for a particular splat, the first cell of a second grid may encode the scaling value for the particular splat, the first cell of a third grid may encode the orientation or rotational information for the particular splat, and the first cell of a fourth grid may encode the spherical harmonics of the particular splat. In some embodiments, more or less grids may be used to encode (at 306) each splat attribute. For instance, separate grids may be used to encode each of the x, y, and z coordinate values of a splat. The encoding (at 306) produces a single set of 2D grids or 2D images that represent the data for rendering the static or constant primitives for the duration of the dynamic 3D content or the dynamic 3D content segment.

3D streaming system 100 selects (at 308) the slower changing primitives of second bin 203 for encoding. The slower changing primitives of second bin 203 are primitives that remain unchanged for at least N frames and less than the duration of the segmented slice or dynamic 3D content that is being encoded.

3D streaming system 100 encodes (at 310) the slower changing primitives with their temporal values at a reduced frame rate to different sets of 2D grids or 2D images. For instance, since the slower changing primitives are defined once with their temporal values and presented across two or more frames based on that single definition, 3D streaming system 100 may encode (at 310) the slower changing primitives that become visible over a set of sequential or consecutive frames at the first frame of each set of sequential or consecutive frames. Accordingly, if the slower changing primitives include primitives that are presented with their original attributes for at least N consecutive frames, then 3D streaming system 100 may encode (at 310) a different set of 2D grids or 2D images to represent the slower changing primitives at every Nth frame or at every N+Mth frame wherein M further reduces the frame rate at which the slower changing primitives are encoded. The encoding (at 310) of the temporal values specifies which a specific frame of the N or N+M consecutive frames at which a particular slower changing primitive is presented with its original attributes and further specifies the number of frames before and after the specific frame that the particular slower changing primitive is presented with its original attributes and/or is blended in and out from its original attributes.

3D streaming system 100 selects (at 312) the fast changing primitives of third bin 205 for encoding. The fast changing primitives of third bin 205 are primitives that remain unchanged for a single frame or less than the N frames.

3D streaming system 100 encodes (at 314) the fast changing primitives without their temporal values at an original frame rate of the dynamic 3D content. In particular, since the fast changing primitives are presented for a single frame or less than the N frames, it is more efficient to define the fast changing primitives in the set of 2D grids or 2D images that encode (at 314) the fast changing primitive data for those primitives. Accordingly, 3D streaming system 100 generates a different set of 2D grids or 2D images for every frame of the dynamic 3D content and encodes (at 314) the attribute data excluding the temporal values for the fast changing primitives that are presented with their original attributes in those frames. The size of each set of 2D grids or 2D images representing each frame may differ based on the number of fast changing primitives or splats that are encoded (at 314) to each set of 2D grids or 2D images. For instance, if a first frame has a first number of fast changing primitives associated with it and a second frame has a smaller second number of fast changing primitives associated with it, then the first set of 2D cells or 2D images encoding the fast changing primitive data for the first frame will have more cells or pixels than the second set of 2D cells or 2D images encoding the fast changing primitive data for the second frame.

3D streaming system 100 therefore encodes the primitive data associated with each temporal bin 201, 203, and 205 differently and may generate a different data stream for encoded primitive data of each bin 201, 203, and 205. For instance, the data stream for the static or constant primitives is a single set of 2D grids or 2D images that exclude the temporal values, the data stream for the slower changing primitives is encoded at a reduced frame rate and includes different sets of 2D grids or 2D images that store the attribute values and the temporal values for the slower changing primitives that are defined across two or more frames of a different consecutive or sequential set of frames, and the data stream for the fast changing primitives is encoded at a faster frame rate and includes different sets of 2D grids or 2D images that store the attribute values without the temporal values for the fast changing primitives defined in a particular frame represented by a particular set of 2D grids or 2D images.

Figure 4:
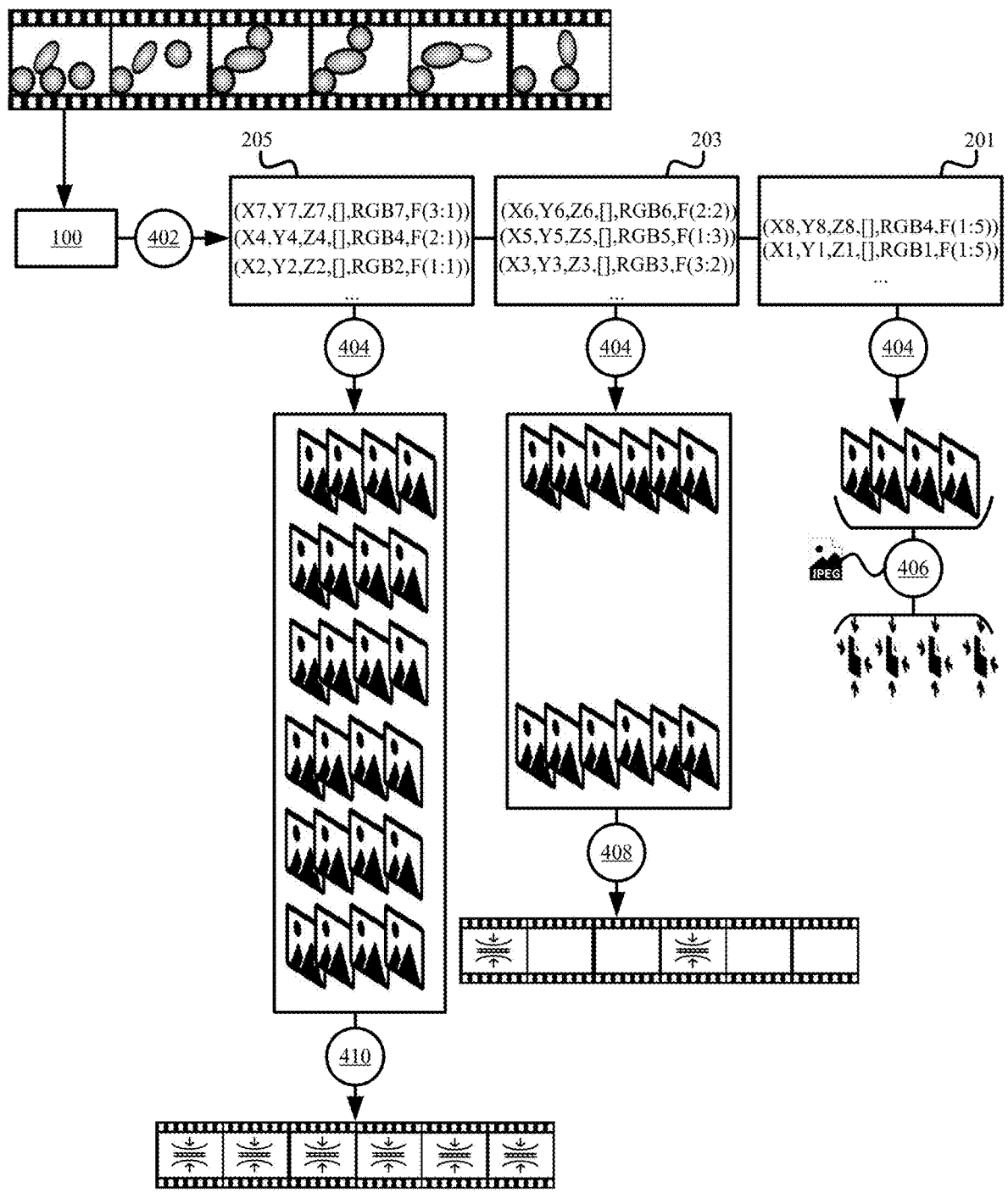
FIG. 4 illustrates an example of compressing dynamic 3D content into different compressed data streams in accordance with some embodiments.

FIG. 4 illustrates an example of compressing dynamic 3D content into different compressed data streams in accordance with some embodiments. 3D streaming system 100 generates (at 402) the temporally segmented data in which primitives of dynamic 3D content are classified to one of three bins based on their opacity function and the duration with which the primitives are presented across the frames of the dynamic 3D content.

3D streaming system 100 performs (at 404) the different encoding of the temporally segmented data. The different encoding may include encoding the grouped primitive data at different frame rates, with different attribute data, and/or as a single set of images. The different encoding may also produce different data streams that collectively provide the primitive data for reconstructing the dynamic 3D content.

3D streaming system 100 performs (at 406) a first compression of the single set of 2D grids or 2D images that encode the static primitives or primitives that are classified to first bin 201 due to the static primitives persisting or not changing for the duration of the dynamic 3D content. The static primitives have no time dependent data and are defined once for the duration of the dynamic 3D content or dynamic 3D content segment. Accordingly, the first compression may include using one or more 2D image compression techniques to compress each 2D grid in the set of 2D grids. In some embodiments, 3D streaming system 100 may use a lossless 2D image compression for the loss-insensitive attributes of the static primitives (e.g., x, y, and z positional coordinates) and may use a lossy 2D image compression for the loss-tolerant attributes of the static primitives (e.g., scaling value, rotational information, spherical harmonics, etc.).

3D streaming system 100 performs (at 408) a second compression of the different sets of 2D grids or 2D images that encode the slower changing primitives at the reduced frame rate. The second compression may include using a video compression technique or codec to compress the different sets of 2D grids or 2D images. For instance, the second compression may be performed (at 408) through frame partitioning, motion estimation, discrete cosine transform, quantization, and/or entropy coding.

3D streaming system 100 performs (at 410) a third compression of the different sets of 2D grids or 2D images that encode the fast changing primitives. The third compression may include applying the same video compression technique or codec used to compress the data for the slower changing primitives. However, since the fast changing primitives are encoded at a different rate than the slower changing primitives, the second compression may generate a different compressed data stream than the third compression.

To improve the first, second, and/or third compression, 3D streaming system 100 may globally sort the grid data across all attributes in order to maximize or improve smoothness. For instance, by reducing the variation in values within different regions of a 2D grid or 2D image, the compression quantization may be improved resulting in greater size reduction with less loss.

Figure 5:
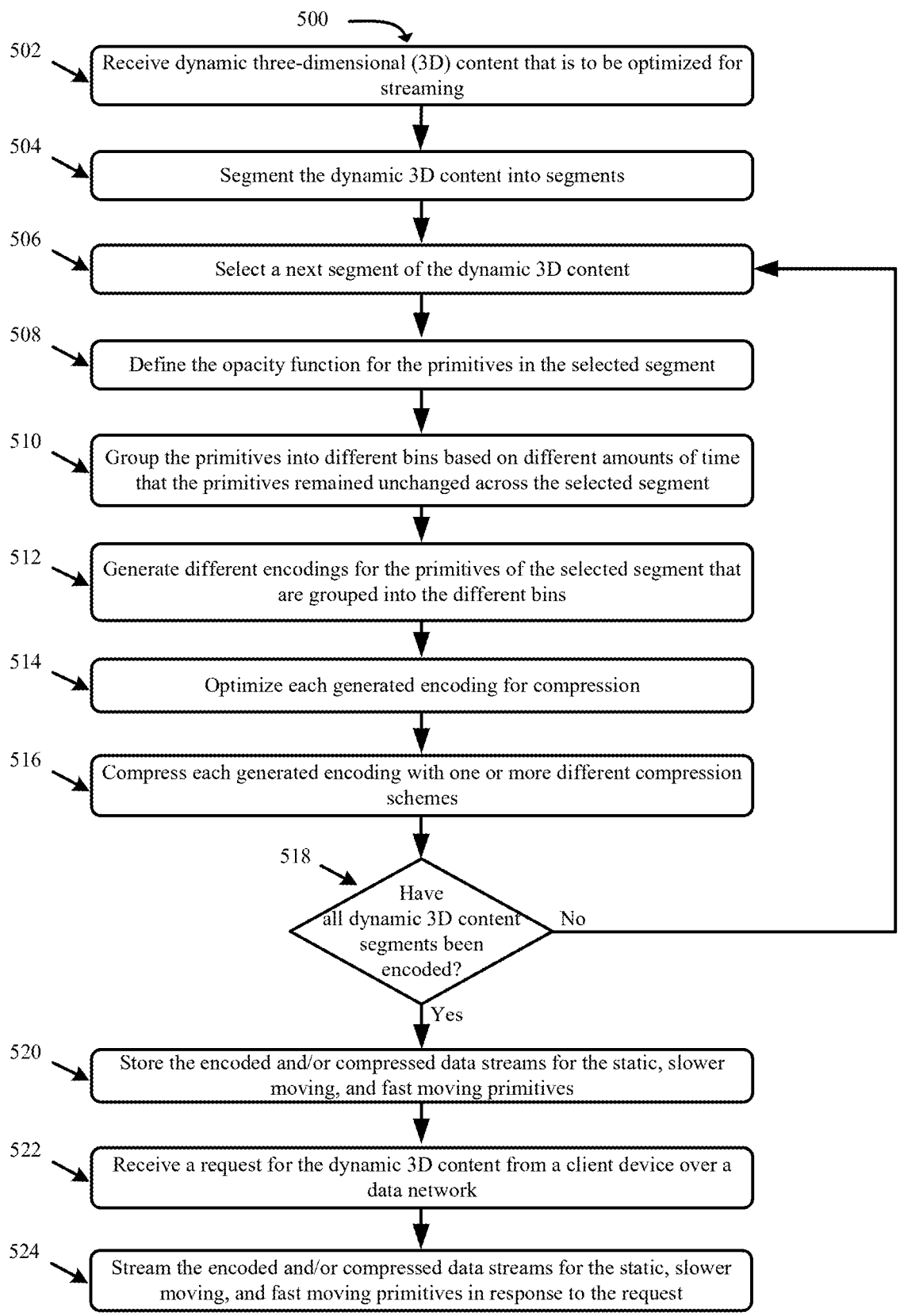
FIG. 5 presents a process for the smooth temporally segmented encoding of dynamic unstructured spatial data in accordance with some embodiments presented herein.

FIG. 5 presents a process 500 for the smooth temporally segmented encoding of dynamic unstructured spatial data in accordance with some embodiments presented herein. Process 500 is implemented by 3D streaming system 100.

3D streaming system 100 may include one or more devices or machines with processor, memory, storage, network, and/or other hardware resources that are configured for 3D content streaming. For instance, 3D streaming system 100 may be part of a live or on-demand 3D content streaming service that different client devices access remotely over a data network. The 3D content hosted or streamed from 3D streaming system 100 may include static 3D models or environments or dynamic 3D content such as 3D videos, 3D animations, 3D games, spatial computing experiences (e.g., virtual reality, mixed reality, augmented reality, or other enhanced reality experiences), and/or other animated 3D content.

Process 500 includes receiving (at 502) dynamic 3D content that is to be optimized for streaming to different client devices over a different data network. The dynamic 3D content may be defined with different sets of splats over different frames. The different sets of splats may generate different visualizations for changes occurring to the dynamic 3D content over a duration spanned by the different frames. In some embodiments, the dynamic 3D content may be encoded with primitives of a different 3D format. For instance, the dynamic 3D content may be defined as a point cloud with the primitives in each frame corresponding to a distributed set of points and with each point being defined with a position in 3D space and visual characteristics (e.g., color, opacity, reflectivity, etc.) that are presented at the defined 3D position. Alternatively, the dynamic 3D content may be defined as a mesh model with the primitives in each frame corresponding to a connected set of meshes. Each mesh may be defined with coordinates for its vertices and visual characteristics for the plane or surface between the vertices. In some such embodiments, 3D streaming system 100 may convert the dynamic 3D content from a point cloud, mesh, or other 3D format into a splat representation via a 4DGS or other splatting technique.

Process 500 includes segmenting (at 504) the dynamic 3D content into segments. For instance, 3D streaming system 100 may segment (at 504) dynamic 3D content that is 5 minutes in length into 15 20-second segments. Each segment may correspond to a separate asset or a new sub-instance of the dynamic 3D content that may be streamed independent of the other segments. The segmentation (at 504) may simplify the processing and/or streaming of the dynamic 3D content (e.g., reduce the amount of 3D data that is entered into memory and optimized at any given time) and to partition the dynamic 3D content into different requestable components.

Process 500 includes selecting (at 506) a next segment of the dynamic 3D content for optimization. 3D streaming system 100 begins with the selection (at 506) of the first segment representing the first segmented frames of the dynamic 3D content and continues sequentially until all segments spanning the full duration of the dynamic 3D content are selected (at 506).

Process 500 includes defining (at 508) the opacity function for the primitives in the selected segment. Defining (at 508) the opacity function includes analyzing consecutive frames of the selected segment to determine which primitives remain constant between the consecutive frames and which primitives change. A primitive (e.g., splat, point, mesh, etc.) remains constant when the position, shape, and visual characteristics of the primitive do not change from one frame to the next. A primitive may remain constant even if the primitive is in the field-of-view of a current frame and out of the field-of-view in a next frame or vice-versa. For instance, some dynamic 3D content allows a user to change or control the field-of-view with the changing field-of-view not affecting the actual position, shape, or visual characteristics of the primitives forming the objects within a larger environment.

3D streaming system 100 may compare the primitive definitions in one frame to the primitive definitions in a next frame to differentiate between the constant and changing splats. In some embodiments, the opacity function specifies when a primitive with a particular definition is presented with its original attributes within the selected segment (e.g., at what frame is the primitive defined and/or presented with the lowest or originally defined opacity) and a width for the number of frames before and after at which the primitive is presented with a modified opacity. Accordingly, the opacity function may be defined with two parameters. A first parameter specifies the median frame number or temporal position within the selected segment that a primitive is defined and/or presented with its original attributes and the second parameter specifies the duration or number of frames at which to present the primitive before and after the median frame number. In some embodiments, the second parameter applies a Gaussian distribution to smoothly blend in the primitive (e.g., change from 100% opacity to the defined opacity value for the primitive at the median frame number or temporal position) and to smoothly blend out the primitive until it is no longer presented. For instance, if the same primitive is defined for frames 3-5 of a segment spanning frames 1-20, then the first parameter of the opacity function may specify a value of 4 and the second parameter of the opacity function may specify a value 5. The second parameter value of 5 causes a rendering device to initially present the primitive at frame 2 with half of the original defined opacity for the primitive, at frames 3-5 with the original defined opacity for the primitive, and at frame 6 with half of the original defined opacity for the primitive so that the primitive is smoothly blended in and out of the scene. Primitives that are defined for a single frame of the selected segment may be defined without the opacity function or may be defined with the first parameter corresponding to the frame at which the primitive is presented and with the second parameter set to a value of 0 or 3 to blend the splat in and out. In some embodiments, the opacity function definition may use the first parameter to specify the first frame or specific time in the selected segment at which the primitive is first defined and the second parameter to specify the number of frames after the first frame or duration after the specific time that the primitive remains unchanged with the same definition.

Process 500 includes grouping (at 510) the primitives into different bins based on different amounts of time that the primitives remained unchanged across the selected segment. The grouping (at 510) may be performed based on the opacity function definition and/or the temporal values or parameters associated with the opacity function. The grouping (at 510) may include placing primitives that are unchanged for less than N frames into a first bin, primitives that are unchanged for N frames or more and less than the entire duration of the selected segment into a second bin, and primitives that are unchanged for the entire duration of the selected segment into a third bin. N may be a value of 2 or more.

Process 500 includes generating (at 512) different encodings for the primitives of the selected segment that are grouped (at 510) into the different bins. Each encoding may correspond to a different data stream for the selected segment. 3D streaming system 100 may generate (at 512) a first encoding or first encoded data stream for the primitives that remain unchanged for the entire duration of the selected segment, a second encoding or second encoded data stream for the primitives that remain unchanged N frames or more and less than the entire duration of the selected segment, and a third encoding or third encoded data stream for the primitives that remain unchanged for less than N frames.

Generating (at 512) the first encoding may include encoding each attribute of the static or constant primitives (e.g., primitives grouped (at 510) to the third bin) into a different 2D grid without encoding the temporal values, parameters, and/or attributes of the opacity function. The same pixel or pixel position within the different 2D grids represents a different attribute value for the same static or constant primitive.

Generating (at 512) the second encoding may include encoding each attribute of the slower changing primitives (e.g., primitives grouped (at 510) to the second bin) including the temporal values, parameters, and/or attributes of the opacity function into a different 2D grid at a first frame rate that is less than the frame rate of the dynamic 3D content. For example, the dynamic 3D content may be encoded and/or rendered at 30 frames per second, and the second encoding may be encoded and/or presented at 3 frames per second with each encoded frame of the second encoding containing the slower changing primitive data for the next 10 frames of the selected segment. In particular, the opacity function attributes encoded in the set of 2D grids specify when and for how many frames each slower changing primitive within the 10 frames is to be presented and/or additional frames with which to blend in and out that slower changing primitive. Therefore, to save bandwidth and/or optimize the dynamic 3D content for streaming, 3D streaming system 100 reduces the number of frames at which the slower changing primitives are defined. The frame rate may be defined based on the minimum number of frames that a primitive remains unchanged (e.g., the number N) in order to be grouped (at 510) to the second bin.

Generating (at 512) the third encoding may include encoding each attribute of the fast changing primitives (e.g., primitives grouped (at 510) to the first bin) without the temporal values, parameters, and/or attributes of the opacity function into a different 2D grid at the second frame rate at which the dynamic 3D content is originally encoded. The first encoding and the third encoding are similar except that the first encoding is defined once with the static primitives for the entire duration of the selected segment, whereas the third encoding is defined with the fast changing primitives for each frame of the selected segment.

Process 500 includes optimizing (at 514) each generated (at 512) encoding for compression. The optimization (at 514) may include globally sorting the grid data across all attributes in order to maximize smoothness. In particular, 3D streaming system 100 analyzes the primitive data at each 2D grid position across the different 2D grids of the encoding, and rearranges the primitive data to minimize the change in value between neighboring pixels.

Process 500 includes compressing (at 516) each generated (at 512) encoding with one or more different compression schemes. 3D streaming system 100 may compress (at 516) each 2D grid of the first encoding for the static or constant primitives using a 2D image compression technique. In particular, each 2D grid is formatted in the same manner as a 2D image and the optimization (at 514) rearranges the primitive data for better smoothness such that existing 2D image compression techniques provide greater data reduction to the encoded data. In some embodiments, different image compression techniques may be used for the primitive data stored in each 2D grid. For instance, a lossless compression may be applied to the one or more 2D grids storing the primitive positional data and a lossy compression may be applied to the one or more 2D grids storing the primitive visual characteristics. 3D streaming system 100 may compress (at 516) each 2D grid of the second encoding for the slower changing primitives and each 2D grid of the third encoding for the fast changing primitives using a 2D video compression technique. In some embodiments, Moving Picture Experts Group (MPEG), Advanced Video Compression (AVC) techniques, or other 2D video codecs or compression techniques are used to compress (at 516) the second and third encodings.

Process 500 includes determining (at 518) whether all segments of the dynamic 3D content have been encoded. In response to determining (at 518—No) that additional dynamic 3D content segments remain that have yet to be encoded, process 500 includes selecting (at 506) a next segment for encoding. In response to determining (at 518—Yes) that the dynamic 3D content has been fully encoded, process 500 includes storing (at 520) the encoded and/or compressed data streams for the static, slower moving, and fast moving primitives.

Process 500 includes receiving (at 522) a request for the dynamic 3D content from a client device over a data network. Process 500 includes streaming (at 524) the encoded and/or compressed data streams for the static, slower moving, and fast moving primitives in response to the request. In some embodiments, the client device requests each segment separately in order to signal that 3D streaming system 100 should continue streaming (at 524) additional parts of the dynamic 3D content. Streaming (at 524) the encoded and/or compressed data streams for a particular segment may include streaming one instance of the compressed first encoding for the static or constant primitives of the particular segment, streaming the compressed second encoding for the slower changing primitives of the particular segment at the reduced first frame rate, and streaming the compressed third encoding for fast changing primitives of the particular segment at the second frame rate that matches the original frame rate of the dynamic 3D content.

The requesting client device receives the different data streams, decodes each of the data streams to reconstruct the data for the different temporally segmented primitives, rendering the primitive data from each data stream, and generating the changing visualization of the dynamic 3D content by combining the visualizations created from each data stream. In particular, the client device renders and presents the primitives from each data stream for the different durations associated with each data stream.

Figure 6:
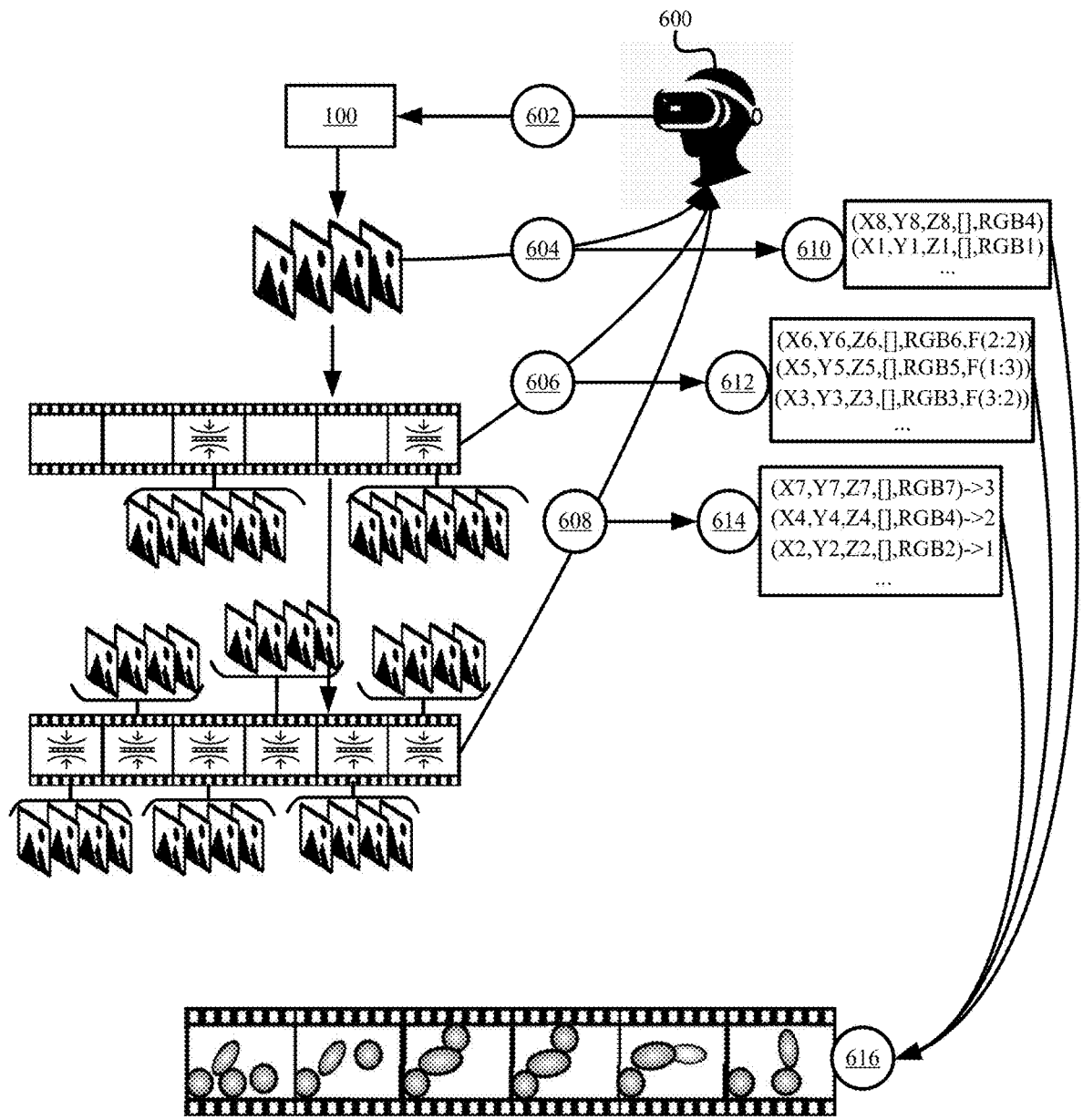
FIG. 6 illustrates an example of decoding and rendering dynamic 3D content from the smooth temporally segmented encodings in accordance with some embodiments presented herein.

FIG. 6 illustrates an example of decoding and rendering dynamic 3D content from the smooth temporally segmented encodings in accordance with some embodiments presented herein. Client device 600 requests (at 602) the dynamic 3D content from 3D streaming system 100. The request may be issued as HyperText Transfer Protocol (HTTP) GET message or in the request format of another network protocol.

Client device 600 receives (at 604) the first encoding representing the primitives that remain unchanged for the duration of the dynamic 3D content or a requested segment of the dynamic 3D content. The first encoding includes a set of 2D grids that each store a different attribute of the unchanged primitives. 3D streaming system 100 may compress the first encoding into various compressed image formats.

Client device 600 receives (at 606) a second encoding representing the primitives that remain unchanged for less than the full duration of the dynamic 3D content or the requested segment and that remain unchanged for at least two frames. 3D streaming system 100 streams (at 606) the second encoding at a reduced frame rate. For instance, the dynamic 3D content may be presented at 30 frames per second and 3D streaming system 100 may stream (at 606) the second encoding once every 10 frames with a first set of 2D grids streamed at the first frame storing the slower changing primitive data for the first 10 frames, a second set of 2D grids streamed at the tenth frame storing the slower changing primitive data for frames 11-20, and a third set of 2D grids streamed at the twentieth frame storing the slower changing primitive data for frames 21-30.

Client device 600 receives (at 608) a third encoding representing the primitives that change with every frame at the frame rate of the dynamic 3D content. For instance, if the frame rate of the dynamic 3D content is rendered at 30 frames per second, client device 600 receives (at 608) a different set of 2D grids for every frame with the different set of 2D grids received for a particular frame representing the attributes for the primitives that exist only for that particular frame or for fewer than N frames.

Client device 600 may decompress each encoding using one or more decompression schemes. Client device 600 decodes (at 610) and renders the static or constant primitives based on the set of 2D grids streamed as part of the first encoding. In particular, client device renders the static or constant primitives for every frame of the dynamic 3D content or requested segment of the dynamic 3D content. In some embodiments, client device 600 marks the decoded (at 610) with a first identifier to indicate that they should be included in the rendering of every frame of the dynamic 3D content.

Client device 600 decodes (at 612) and renders the slower changing primitives at the reduced frame rate. The decoding (at 612) involves determining the set of primitives that are defined for a set of two or more frames, determining at which frame of the set of two or more frames each primitive from the set of primitives is to be presented with its original attributes, and blending in and out the primitives at the determined frames based on width parameter of the opacity function, wherein the width parameter of a particular primitive specifies a number of frames before and after the particular primitive is presented with its original attributes and/or with an increasing and decreasing opacity for the blending effect.

Client device 600 decodes (at 614) and renders the fast changing primitives defined in the set of 2D grids received (at 608) for each frame of the dynamic 3D content. The fast changing primitives are rendered only for the frame that they encoded for.

Client device 600 presents (at 616) the changing visualization of the dynamic 3D content at the frame rate of the dynamic 3D content by combining the visualization created from rendering the static or constant primitives in every frame with the visualization created from rendering the slower changing primitives at the frames or times defined for those slower changing primitives with the visualization created from rendering the fast changing primitives associated with each frame.

Figure 7:
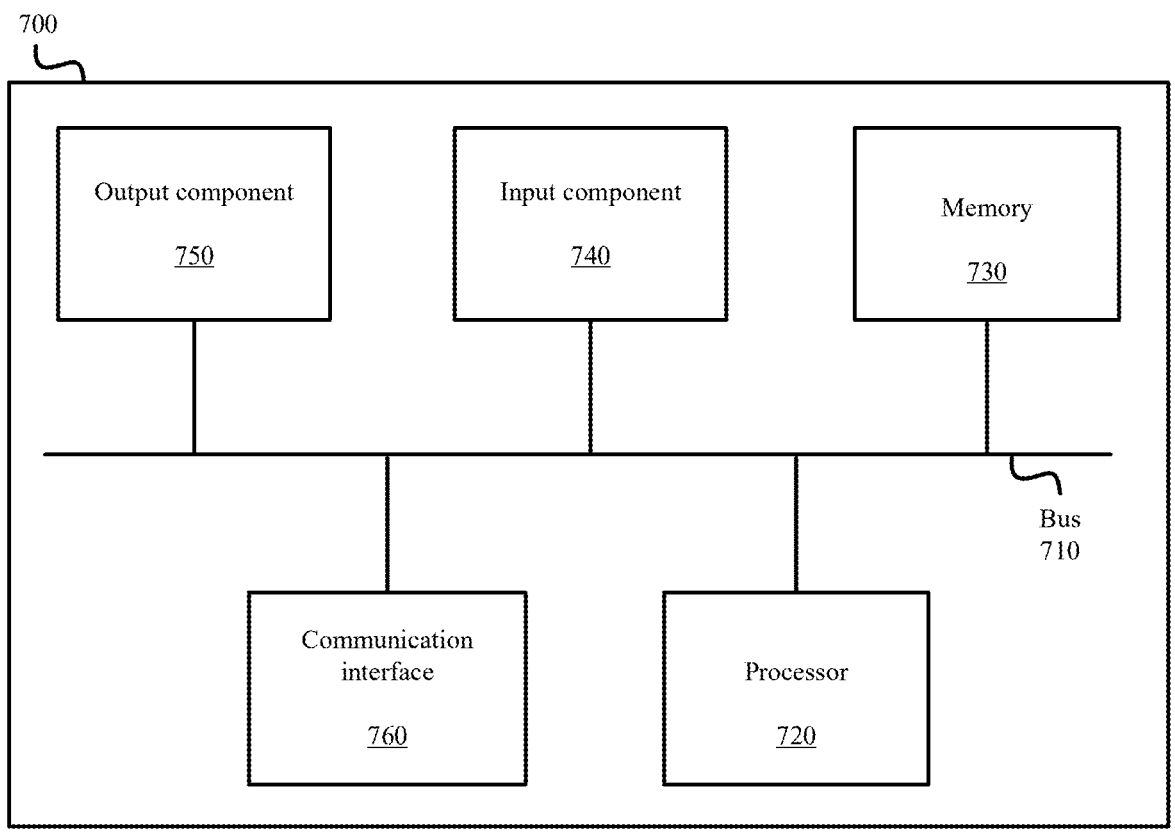
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D streaming system 100, client device 600, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc.

In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while a series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a plurality of primitives that define visual changes that occur to dynamic three-dimensional (3D) content across a plurality of frames;
   determining a first set of primitives from the plurality of primitives that remain unchanged for at least N frames of the plurality of frames and a second set of primitives from the plurality of primitives that remain unchanged for less than the N frames, wherein N is a value greater than 1;
   generating a first data stream that encodes the first set of primitives at a reduced frame rate that is less than a desired frame rate, wherein the first data stream encodes the first set of primitives with temporal values that specify which two or more frames of the plurality of frames at which to present different primitives of the first set of primitives;
   generating a second data stream that encodes the second set of primitives without temporal values at the desired frame rate and with each different frame at the desired frame rate encoding data of one or more primitives from the second set of primitives that are presented without change at that different frame;
   receiving a request for the 3D content; and
   streaming the first data stream and the second data stream in response to the request.

2. The method of claim 1 further comprising:
   determining a third set of primitives from the plurality of primitives that do not change across the plurality of frames; and
   encoding the third set of primitives as a single set of one or more grids.

3. The method of claim 2 further comprising:
   streaming the single set of one or more grids representing the third set of primitives with the first data stream and the second data stream.

4. The method of claim 1 further comprising:
   defining temporal values for different primitives of the plurality of primitives based on an amount of time or a number of the plurality of frames that each primitive of the different primitives remains unchanged.

5. The method of claim 1 further comprising:
   classifying the plurality of primitives to a plurality of bins based on a number of frames that each of the plurality of primitives is presented without change across the plurality of frames, wherein said classifying comprises grouping the first set of primitives to a first bin of the plurality of bins and grouping the second set of primitives to a second bin of the plurality of bins.

6. The method of claim 1,
   wherein generating the first data stream comprises encoding the first set of primitives as different sets of one or more grids across a subset of the plurality of frames covered by the reduced frame rate; and
   wherein generating the second data stream comprises encoding the second set of primitives with a different set of one or more grids for each frame of the plurality of frames and with the different set of one or more grids for a particular frame of the plurality of frames encoding data of one or more primitives from the second set of primitives that are presented at the particular frame without change.

7. The method of claim 6 further comprising:
   compressing the different sets of one or more grids from the first data stream at a first frame rate using a video codec; and
   compressing each different set of one or more grids from the second data stream at a second frame rate using the video codec.

8. The method of claim 6, wherein encoding a particular set of one or more grids for the first data stream comprises:
   encoding a positional attribute of a different primitive from a subset of the first set of primitives to a different cell of a first grid from the particular set of one or more grids; and
   encoding a visual characteristic attribute of a different primitive from the subset of the first set of primitives to a corresponding different cell of a second grid from the particular set of one or more grids.

9. The method of claim 6 further comprising:
   optimizing the first data stream and the second data stream for compression by sorting data in each set of one or more grids for smoothness.

10. The method of claim 1,
    wherein generating the first data stream comprises encoding positional and visual characteristic attributes of the first set of primitives with the temporal values that specify which of the plurality of frames each primitive of the first set of primitives is presented; and
    wherein generating the second data stream comprises encoding positional and visual characteristic attributes of the second set of primitives without temporal values.

11. The method of claim 1, wherein streaming the first data stream and the second data stream comprises:
streaming a different set of grids associated with the first data stream at a different one of a subset of the plurality of frames, wherein the subset of the plurality of frames comprises fewer frames than the plurality of frames; and
streaming a different set of grids associated with the second data stream with a different frame of the plurality of frames.

12. The method of claim 1, wherein streaming the first data stream and the second data stream comprises streaming less data than streaming all data associated with the plurality of primitives.

13. The method of claim 1, wherein said determining comprises:
analyzing positional and visual characteristic attributes of the plurality of primitives across pairs of consecutive frames; and
differentiating the first set of primitives from the second set of primitives based on said analyzing of the positional and visual characteristic attributes.

14. The method of claim 1, wherein generating the first data stream comprises:
encoding a first set of grids with data for a first subset of the first set of primitives that are defined without change in the at least N frames across a first set of the plurality of frames; and
encoding a second of grids with data for a second subset of the first set of primitives that are defined without change in the at least N frames across a second set of the plurality of frames.

15. The method of claim 14,
wherein encoding the first set of grids comprises defining the temporal values that specify which of the first set of the plurality of frames each primitive of the first subset of primitives is defined without change; and
wherein encoding the second set of grids comprises defining the temporal values that specify which of the second set of the plurality of frames each primitive of the second subset of primitives is defined without change.

16. A streaming system comprising:
one or more hardware processors configured to:
receive a plurality of primitives that define visual changes that occur to dynamic three-dimensional (3D) content across a plurality of frames;
determine a first set of primitives from the plurality of primitives that remain unchanged for at least N frames of the plurality of frames and a second set of primitives from the plurality of primitives that remain unchanged for less than the N frames, wherein N is a value greater than 1;
generate a first data stream that encodes the first set of primitives at a reduced frame rate that is less than a desired frame rate, wherein the first data stream encodes the first set of primitives with temporal values that specify which two or more frames of the plurality of frames at which to present different primitives of the first set of primitives;
generate a second data stream that encodes the second set of primitives without temporal values at the desired frame rate and with each different frame at the desired frame rate encoding data of one or more primitives from the second set of primitives that are presented without change at that different frame;
receive a request for the 3D content; and
stream the first data stream and the second data stream in response to the request.

17. The streaming system of claim 16, wherein the one or more hardware processors are further configured to:
determine a third set of primitives from the plurality of primitives that do not change across the plurality of frames; and
encode the third set of primitives as a single set of one or more grids.

18. The streaming system of claim 17, wherein the one or more hardware processors are further configured to:
stream the single set of one or more grids representing the third set of primitives with the first data stream and the second data stream.

19. The streaming system of claim 16, wherein the one or more hardware processors are further configured to:
define temporal values for different primitives of the plurality of primitives based on an amount of time or a number of the plurality of frames that each primitive of the different primitives remains unchanged.

20. A non-transitory computer-readable medium storing instructions that, when executed by one or more processors of a streaming system, cause the streaming system to perform operations comprising:
receiving a plurality of primitives that define visual changes that occur to dynamic three-dimensional (3D) content across a plurality of frames;
determining a first set of primitives from the plurality of primitives that remain unchanged for at least N frames of the plurality of frames and a second set of primitives from the plurality of primitives that remain unchanged for less than the N frames, wherein N is a value greater than 1;
generating a first data stream that encodes the first set of primitives at a reduced frame rate that is less than a desired frame rate, wherein the first data stream encodes the first set of primitives with temporal values that specify which two or more frames of the plurality of frames at which to present different primitives of the first set of primitives;
generating a second data stream that encodes the second set of primitives without temporal values at the desired frame rate and with each different frame at the desired frame rate encoding data of one or more primitives from the second set of primitives that are presented without change at that different frame;
receiving a request for the 3D content; and
streaming the first data stream and the second data stream in response to the request.

* * * * *